United States Patent
Byun et al.

(10) Patent No.: US 8,301,184 B2
(45) Date of Patent: Oct. 30, 2012

(54) APPARATUS AND METHOD FOR CONFIGURATION AND OPTIMIZATION OF AUTOMATIC NEIGHBOR RELATION IN WIRELESS COMMUNICATION SYSTEM

(75) Inventors: Hee-Jung Byun, Anyang-si (KR); Jung-Min So, Seoul (KR); Mi-Sun Do, Suwon-si (KR); Jung-Hee Han, Seoul (KR); Hyon-Goo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 12/842,294

(22) Filed: Jul. 23, 2010

(65) Prior Publication Data

US 2011/0028181 A1 Feb. 3, 2011

(30) Foreign Application Priority Data

Jul. 28, 2009 (KR) ........................ 10-2009-0068656

(51) Int. Cl.
*H04W 36/00* (2009.01)

(52) U.S. Cl. ...................... 455/525; 455/67.11; 455/438; 455/439; 370/252; 370/332

(58) Field of Classification Search .................. 455/525, 455/67.11, 438, 439, 524, 507, 436, 444, 455/422.1, 424, 69, 522, 572, 434; 370/252, 370/332, 331

See application file for complete search history.

(56) References Cited

U.S. PATENT DOCUMENTS

| | | | |
|---|---|---|---|
| 2003/0119452 A1* | 6/2003 | Kim et al. | 455/69 |
| 2006/0276191 A1* | 12/2006 | Hwang et al. | 455/436 |
| 2006/0281462 A1* | 12/2006 | Kim et al. | 455/436 |
| 2010/0130211 A1* | 5/2010 | Bae et al. | 455/438 |
| 2010/0222055 A1* | 9/2010 | Cho et al. | 455/434 |
| 2010/0234027 A1* | 9/2010 | Han et al. | 455/436 |
| 2012/0106370 A1* | 5/2012 | Radulescu et al. | 370/252 |

* cited by examiner

*Primary Examiner* — Tan Trinh

(74) *Attorney, Agent, or Firm* — Jefferson IP Law, LLP

(57) ABSTRACT

An apparatus and method for configuration and optimization of an Automatic Neighbor Relation (ANR) in a wireless communication system are provided. The method of configuring the ANR by a Base Station (BS) in the wireless communication system includes receiving a measurement report message for reporting a neighbor cell's signal quality from one or more User Equipments (UEs), determining a neighbor cell, reported from a UE in an area where a serving cell's signal quality is greater than a first reference value, as an Overlay Neighbor (ON), among neighbor cells reported using the measurement report message, and determining a neighbor cell, reported from a UE in an area where the serving cell's signal quality is less than a second reference value, as a Horizontal Neighbor (HN), among the neighbor cells reported using the measurement report message, wherein the second reference value is set to a value smaller than the first reference value.

26 Claims, 14 Drawing Sheets

INTER-FERQUENCY
NEIGHBOR RELATION TABLE

| NEIGHBOR RELATION | | OAM CONTROLLED NEIGHBOR RELATION ATTRIBUTES | | | |
|---|---|---|---|---|---|
| NR | TCI | NO Remove | No HO | No X2 | ON |
| 1 | TCI#1 | | | | |
| 2 | TCI#1 | ✓ | | | |
| 3 | TCI#1 | ✓ | | | ✓ |
| | | | | | |

FIG.4A

INTER-RAT
NEIGHBOR RELATION TABLE

| NEIGHBOR RELATION | | OAM CONTROLLED NEIGHBOR RELATION ATTRIBUTES | | |
|---|---|---|---|---|
| NR | TCI | NO Remove | No HO | ON |
| 1 | TCI#1 | | | |
| 2 | TCI#1 | ✓ | | |
| 3 | TCI#1 | ✓ | | ✓ |
| | | | | |

FIG.4B

APPARATUS AND METHOD FOR CONFIGURATION AND OPTIMIZATION OF AUTOMATIC NEIGHBOR RELATION IN WIRELESS COMMUNICATION SYSTEM

PRIORITY

This application claims the benefit under 35 U.S.C. §119(a) of a Korean patent application filed in the Korean Intellectual Property Office on Jul. 28, 2009 and assigned Serial No. 10-2009-0068656, the entire disclosure of which is hereby incorporated by reference.

BACKGROUND OF THE INVENTION

1. Field of the Invention

The present invention relates to an apparatus and method for configuration and optimization of an Automatic Neighbor Relation (ANR) in a wireless communication system. More particularly, the present invention relates to an apparatus and method for automatically recognizing inter-Radio Access Technologies (RAT)/frequency cells and for identifying and managing the inter-RAT/frequency cells according to a handover purpose (i.e., mobility guarantee and load balancing/cell outage compensation) in a wireless communication system.

2. Description of the Related Art

A $2^{nd}$ generation (2G) mobile communication technique generally provides voice-oriented services and includes Global System for Mobile Communications (GSM), Interim Standard (IS)-95, etc. GSM was commercialized in 1992 in and around Europe, and provides a service by using Time Division Multiple Access (TDMA). IS-95 was commercialized in and around Korea and the USA, and uses Code Division Multiple Access (CDMA).

A $3^{rd}$ generation (3G) mobile communication technique, evolved from the 2G mobile communication technique, refers to a mobile communication technique supporting not only a voice service but also a packet service, and uses CDMA. The 3G mobile communication technique includes $3^{rd}$ Generation Project Partnership (3GPP) or Universal Mobile Telecommunication System (UMTS) as European and Japanese standards based on asynchronization between Base Stations (BSs) and 3rd Generation Project Partnership 2 (3GPP2) or CDMA2000 as a USA standard based on synchronization between BSs. The 3GPP proposes Frequency Division Duplexing (FDD) for dividing uplink/downlink communication in terms of frequency and Time Division Duplexing (TDD) for dividing uplink/downlink communication in terms of time in order to improve efficiency of limited channel usage. The use of TDD includes Wide-Band TDD (WB-TDD) using a chip rate of a 3.84 Mega chip per second (Mcps) and Narrow-Band TDD (NB-TDD) using a chip rate of 1.28 Mcps.

When a service based on the 3G mobile communication technique is commercialized, it is apparent that this service will coexist with a service based on the 2G mobile communication technique which has already been commercialized and is presently in use. In this case, the 2G and 3G mobile communication systems use different frequencies or communication schemes and thus a method for providing mutual compatibility between the two systems is required. In particular, a handover-related issue is the most urgent issue to be dealt with in order to provide mutual compatibility between the systems using the different communication schemes or the different frequencies. That is, systems which use different communication schemes (e.g., FDD, WB-TDD, NB-TDD, GSM, CDMA2000, etc.) as described above or which use the same communication scheme but use different frequencies may exist consecutively across several regions. In such a situation, if a User Equipment (UE) moves from the coverage of a BS which currently provides a service by using a specific communication scheme and a specific frequency to the coverage of another BS using another communication scheme and/or another frequency, a handover is necessary between the BSs for global roaming. In this case, the handover between the BSs includes an inter-frequency handover and an Inter-Radio Access Technologies (RAT) handover.

The inter-RAT handover is a handover between mobile communication systems using different communication schemes. For the inter-RAT handover, a UE is required to monitor a state of a BS as a target of the handover (hereinafter, referred to as a target BS) in a mobile communication system. The monitoring of the target BS is referred to as "inter-RAT measurement".

The inter-frequency handover is a handover between mobile communication systems using different frequencies. That is, the inter-frequency handover implies a handover used even when BSs of mobile communication systems using the same communication scheme use different frequencies. For the inter-frequency handover, the UE also has to be capable of monitoring the state of the target BS. The monitoring of the state of the target BS is referred to as "inter-frequency measurement".

A method for configuration and optimization of an Automatic Neighbor Relation (ANR) is used in a Self-Organizing Network (SON). At present, a Neighbor Cell List (NCL) is manually created through coverage predictions by using a cell planning tool before the BS is installed. However, it is difficult to obtain the NCL correctly due to an imperfect map and building data, and thus a drive/walk test is additionally performed to obtain a correct NCL. The NCL created through the coverage predictions is used directly without alteration. However, a new cell may be added near an area where the BS is currently being operating, or the existing cell may be removed. In addition, due to an environmental change, the coverage of the existing neighbor cell may change and thus a Neighbor Relation (NR) may change. Therefore, when the NCL does not change, a handover may be made to an unsuitable cell. Further, a handover delay may result in an increase of a call drop rate and a decrease of system performance. Accordingly, there is a need for a new method for automatically maintaining an optimal NCL depending on the environmental change.

The conventional method for configuration and optimization of the ANR primarily relates to an intra-frequency Long Term Evolution (LTE) network. A cell deployment type was hot-spot deployment when the LTE was first introduced and soon will extend to one-to-one deployment. As a result, an inter-RAT/frequency handover may frequently occur. Therefore, for service/call continuity, there is a need for a method for configuration and optimization of a Neighbor Relation Table (NRT) by automatically recognizing a cell for the inter-RAT handover (hereinafter, 'inter-RAT cell') and a cell for the inter-frequency handover (hereinafter, 'inter-frequency cell').

The inter-RAT/frequency cell is deployed for the purpose of capacity improvement. For this, the deployment type includes 3 types, i.e., hot-spot deployment, one-to-one deployment, and disjoint deployment.

FIGS. 1A, 1B and 1C are diagrams for illustrating a deployment type of an inter-Radio Access Technologies (RAT)/frequency cell in a conventional wireless communication system.

In the case of hot-spot deployment, as illustrated in FIG. 1A, cells 100-1 to 100-4 having one RAT/frequency (e.g., RAT1/F1) are basically deployed, and cells 101-1 and 101-2 having another RAT/frequency (e.g., RAT2/F2) are additionally deployed in a hot-spot area. Mobility guarantee is the most important issue in the case of using hot-spot deployment. Service/call continuity must be guaranteed for UEs located in the edge of the cells 101-1 and 101-2, and for this, the cells 101-1 and 101-2 must manage the cells 100-1 to 100-4 as neighbor cells. Of course, in addition to the mobility guarantee, load balancing may also be a HandOver (HO) scenario in hot-spot deployment. However, since the mobility guarantee is the primary purpose, in the case of hot-spot deployment, a handover is performed by selecting inter-RAT/frequency cells suitable for the mobility guarantee.

In the case of one-to-one deployment, as illustrated in FIG. 1B, cells 102-1 to 102-4 having one RAT/frequency (e.g., RAT1/F1) are basically deployed, and cells 103-1 to 103-4 having another RAT/frequency (e.g., RAT2/F2) are respectively overlaid with the cells 102-1 to 102-4. In the case of using one-to-one deployment, a relation between one RAT/frequency and another RAT/frequency is more significant in terms of load balancing between the two in comparison with the mobility guarantee. This is because, since a Radio Frequency (RF) condition from a cell corresponding to each RAT/frequency to a UE is similar when fully overlaid, signal quality recognized by the UE from the cell corresponding to each RAT/frequency is also similar, and thus a probability of handover occurrence for the mobility guarantee is relatively small. The inter-RAT handover is a compensation method used when cell outage occurs. Therefore, in the case of using one-to-one deployment, there is a need to identify overlaid neighbor cells and to manage the identified overlaid neighbor cells by using an NCL useful for load balancing or cell outage compensation.

In the case of disjoint deployment, as illustrated in FIG. 1C, cells 104-1 and 104-2 having one RAT/frequency (e.g., RAT1/F1) and cells 105-1 and 105-2 having another RAT/frequency (e.g., RAT2/F2) are deployed without being overlaid. UEs located between the cell 104-2 having the RAT1/F1 and the cell 105-1 having the RAT2/F2 in FIG. 1C always require a handover for service/call continuity. In the case of using disjoint deployment, the inter-RAT/frequency handover puts a higher priority on mobility guarantee than load balancing. Therefore, there is a need to select neighbor cells suitable for mobility guarantee and to manage the selected neighbor cells by using the NCL for mobility guarantee.

As such, the purpose of using the inter-RAT/frequency handover varies depending on the deployment type of inter-RAT/frequency cells, unlike the intra-RAT/frequency handover. This is because the intra-RAT/frequency handover is used primarily for the purpose of mobility guarantee, whereas when using the inter-RAT/frequency handover, cells each having a different RAT/frequency may cover a similar area according to the deployment type of the inter-RAT/frequency cells. Therefore, there is a need for a method of identifying a neighbor cell that may be used for the purpose of load balancing/cell outage compensation or the like in addition to mobility guarantee. That is, there is a need for a method of recognizing a deployment type of inter-RAT/frequency cells and of identifying and managing the inter-RAT/frequency cells according to a handover purpose (i.e., mobility guarantee, load balancing/cell outage compensation).

SUMMARY OF THE INVENTION

An aspect of the present invention is to address at least the above-mentioned problems and/or disadvantages and to provide at least the advantages described below. Accordingly, an aspect of the present invention is to provide an apparatus and method for configuration and optimization of an Automatic Neighbor Relation (ANR) in a wireless communication system.

Yet another aspect of the present invention is to provide an apparatus and method for automatically recognizing inter-Radio Access Technologies (RAT)/frequency cells and for identifying and managing the RAT/frequency cells according to a handover purpose (i.e., mobility guarantee and load balancing/cell outage compensation) in a wireless communication system.

Still another aspect of the present invention is to define a new event for triggering a User Equipment (UE) to perform measurement and send a measurement report in order to identify an overlay cell among the inter-RAT/frequency cells.

Another aspect of the present invention is to provide a method for configuration of an ANR by identifying a type of inter-RAT/frequency cells on the basis of a measurement report of a UE and for optimization of the ANR by performing Neighbor Relation (NR) addition, NR removal, and NR ranking for each type of the inter-RAT/frequency cells.

In accordance with an aspect of the present invention, a method of configuring an ANR by a Base Station (BS) in a wireless communication system is provided. The method includes receiving a measurement report message for reporting a neighbor cell's signal quality from one or more UEs, determining a neighbor cell, reported from a UE in an area where a serving cell's signal quality is greater than a first reference value, as an Overlay Neighbor (ON), among neighbor cells reported using the measurement report message, and determining a neighbor cell, reported from a UE in an area where the serving cell's signal quality is less than a second reference value, as a Horizontal Neighbor (HN), among the neighbor cells reported using the measurement report message, wherein the second reference value is set to a value smaller than the first reference value.

In accordance with another aspect of the present invention, a method of transmitting a measurement report message of a UE in a wireless communication system is provided. The method includes measuring a serving cell's signal quality, if at least one of the serving cell's signal quality is greater than a first reference value and the serving cell's signal quality is less than a second reference value, measuring a neighbor cell's signal quality and setting the second reference value to a value less than the first reference value, and generating a measurement report message including the measured neighbor cell's signal quality.

In accordance with yet another aspect of the present invention, a BS apparatus for configuring an ANR in a wireless communication system is provided. The apparatus includes a reception modem for receiving a measurement report message for reporting a neighbor cell's signal quality from one or more UEs, and a Neighbor Relation Table (NRT) manager for determining a neighbor cell reported from a UE in an area where a serving cell's signal quality is greater than a first reference value as an ON among neighbor cells reported using the measurement report message and for determining a neighbor cell reported from a UE in an area where the serving cell's signal quality is less than a second reference value as an HN among the neighbor cells reported using the measurement report message, wherein the second reference value is set to a value smaller than the first reference value.

In accordance with still another aspect of the present invention, a UE apparatus for transmitting a measurement report message in a wireless communication system is provided. The apparatus includes a signal quality measurement unit for measuring a serving cell's signal quality and for measuring a neighbor cell's signal quality if at least one of the serving cell's signal quality is greater than a first reference value and the serving cell's signal quality is less than a second reference value, wherein the second reference value is set to a value less than the first reference value, and message generator for generating a measurement report message comprising the measured neighbor cell's signal quality.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A and 4B illustrate configurations of an inter-RAT/frequency Neighbor Relation Table (NRT) in a wireless communication system according to an exemplary embodiment of the present invention;

Throughout the drawings, like reference numerals will be understood to refer to like parts, components, and structures.

DETAILED DESCRIPTION OF EXEMPLARY EMBODIMENTS

Figure 1A:
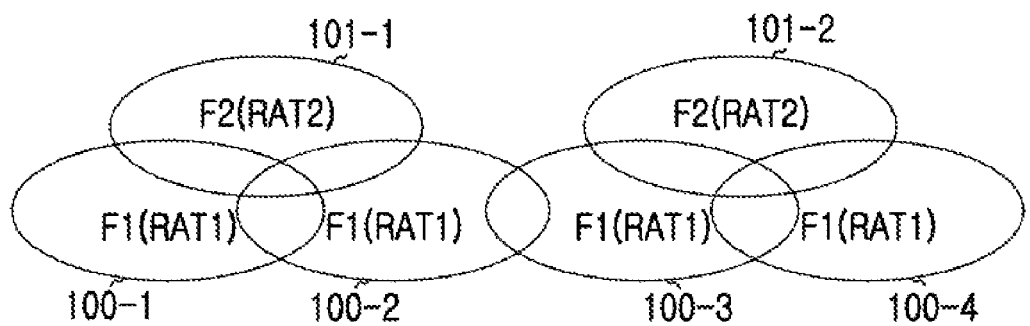
FIGS. 1A, 1B and 1C are diagrams for illustrating a deployment type of an inter-Radio Access Technologies (RAT)/frequency cell in a conventional wireless communication system.
Figure 1B:
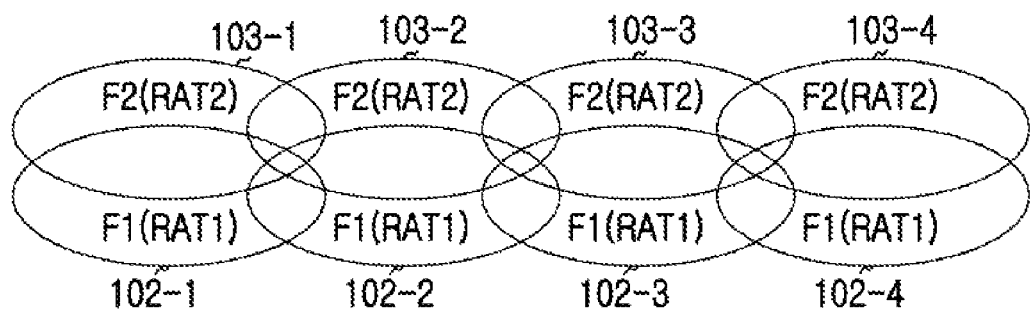
Figure 1C:
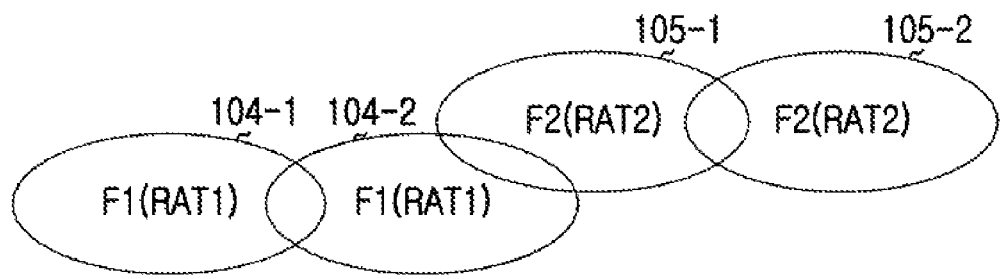

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described below relate to a method for configuration and optimization of an Automatic Neighbor Relation (ANR) in a wireless communication system. For this, a method of automatically recognizing inter-Radio Access Technologies (RAT)/frequency cells and identifying and managing the inter-RAT/frequency cells on the basis of a handover purpose (i.e., mobility guarantee and load balancing/cell outage compensation) in a wireless communication system will be described according to exemplary embodiments of the present invention. Further, a new event is defined to trigger a User Equipment (UE) to perform a measurement and send a measurement report in order to identify an overlay cell among the inter-RAT/frequency cells. Furthermore, exemplary embodiments of the present invention relate to a method for configuration of the ANR by identifying a type of the inter-RAT/frequency cells on the basis of the measurement report of the UE and for optimization of the ANR by performing Neighbor Relation (NR) addition, NR removal, and NR ranking for each type of the inter-RAT/frequency cells.

According to exemplary embodiments of the present invention, each Base Station (BS) classifies the inter-RAT/frequency cell into two types, i.e., a Horizontal Neighbor (HN) and an Overlay Neighbor (ON), on the basis of the measurement report of the UE.

Figure 2A:
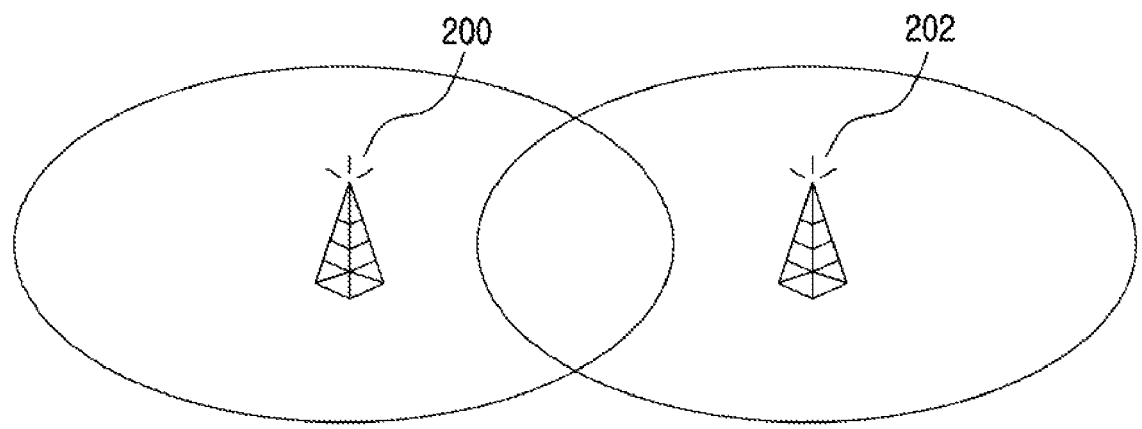
FIGS. 2A and 2B are diagrams for illustrating an inter-RAT/frequency cell of which a type is classified into a Horizontal Neighbor (HN) and an Overlay Neighbor (ON) in a wireless communication system according to an exemplary embodiment of the present invention.
Figure 2B:
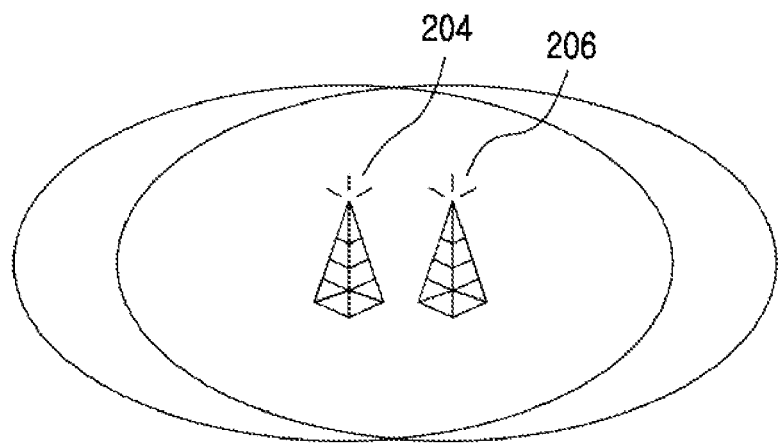

FIGS. 2A and 2B are diagrams for illustrating an inter-RAT/frequency cell of which a type is classified into a Horizontal Neighbor (HN) and an Overlay Neighbor (ON) in a wireless communication system according to an exemplary embodiment of the present invention.

Referring to FIG. 2A, an HN is a neighbor in which a cell 200 having one RAT/frequency and a cell 202 having another RAT/frequency are deployed without being fully overlaid, and may be used for mobility guarantee. The UE is handed over to another RAT/frequency cell among the inter-RAT/frequency cells determined as the HN primarily for the purpose of service/call continuity. Although a load balancing aspect is also included in the purpose, under the premise that a deployment time of a cell will be extended to 1:1 deployment from hot-spot deployment used when Long Term Evolution (LTE) is first introduced, it is preferable to put more emphasis on mobility guarantee, i.e., service/call continuity. Therefore, regarding a handover to the HN, service/call continuity may be a primary purpose, and load balancing may be a secondary purpose.

Referring to FIG. 2B, the ON is a neighbor in which a cell 204 having one RAT/frequency and a cell 206 having another RAT/frequency are deployed so that they are fully overlaid, and may be effectively used for load balancing, cell outage compensation, etc., in addition to mobility guarantee. The load balancing, the cell outage compensation, etc., may be a more important reason regarding why the UE is handed over to another RAT/frequency call among inter-RAT frequency cells determined as the ON in comparison with the service/call continuity. This is because the UE recognizes signals with similar qualities from a cell corresponding to each RAT/frequency and thus has a relatively small probability of handover occurrence for mobility guarantee. However, when load balancing or a cell outage occurs, the BS allows UEs that are not located within a service area to be handed over to an overlaid neighbor cell, thereby expecting an effect of load balancing and cell outage compensation.

In addition, an exemplary embodiment of the present invention define $S_{Measure\_Overlay}$ as a new reference value for triggering the UE to perform measurement and send a measurement report in order to identify the ON (i.e., an overlay cell) among inter-RAT/frequency cells. That is, $S_{Measure\_Overlay}$ is a reference value for identifying the ON which is one type of inter-RAT/frequency cells defined according to an exemplary embodiment of the present invention. If a serving cell's signal quality Ss is greater than $S_{Measure\_Overlay}$, the UE searches for the inter-RAT/frequency cell and reports the search result to the BS. A UE measurement configuration for identifying the overlay cell is on/off controlled by an Element Management System (EMS). For example, the UE measurement configuration may be turned on when the BS is initially installed or a new neighbor cell is installed.

Further, $S_{Measure}$ is defined as a reference value for triggering the UE to perform measurement and send a measurement report of the UE in order to identify the HN among the inter-RAT/frequency cells. That is, $S_{Measure}$ is a reference value for identifying the HN which is one type of inter-RAT/frequency cells defined according to an exemplary embodiment of the present invention. If the serving cell's signal quality Ss is less than $S_{Measure}$, the UE searches for the inter-RAT/frequency cell and reports the search result to the BS.

Furthermore, according to an exemplary embodiment of the present invention, the BS manages a signal quality $\overline{S}_{f_{ij}}$ of the inter-RAT/frequency cells of which a measurement result is reported from the UE. Herein, $\overline{S}_{f_{ij}}$ denotes an average measurement signal quality or a maximum measurement signal quality of UEs with respect to $f_{ij}$, where $f_{ij}$ is a cell having a Physical Cell Identifier (PCI) j and operating in a carrier frequency i.

If $\overline{S}_{f_{ij}}$ denotes the average measurement signal quality of the UEs with respect to $f_{ij}$, $\overline{S}_{f_{ij}}$ may be determined by using Equation (1) below. If $\overline{S}_{f_{ij}}$ denotes the maximum measurement signal quality of the UEs with respect to $f_{ij}$, $\overline{S}_{f_{ij}}$ may be determined by using Equation (2) below.

$$\overline{S}_{f_{ij}} = \frac{\sum_K S_{f_{ij}k} 1_{f_{ij}k}}{\sum_K 1_{f_{ij}k}} \quad (1)$$

$$\overline{S}_{f_{ij}} = \max_K S_{f_{ij}k} \quad (2)$$

In Equation (1) and Equation (2) above, K denotes a set of active users, $f_{ij}$ denotes a cell operating in a carrier frequency i with a PCI j, and $S_{f_{ij}k}$ denotes a signal quality of the cell $f_{ij}$ measured by a user k. $1_{f_{ij}k}$ is an indicator function and has a value of '1' or '0' to indicate whether the cell $f_{ij}$ is reported from the user k. It is assumed hereinafter that $\overline{S}_{f_{ij}}$ is determined by using Equation (1) above.

Figure 3A:
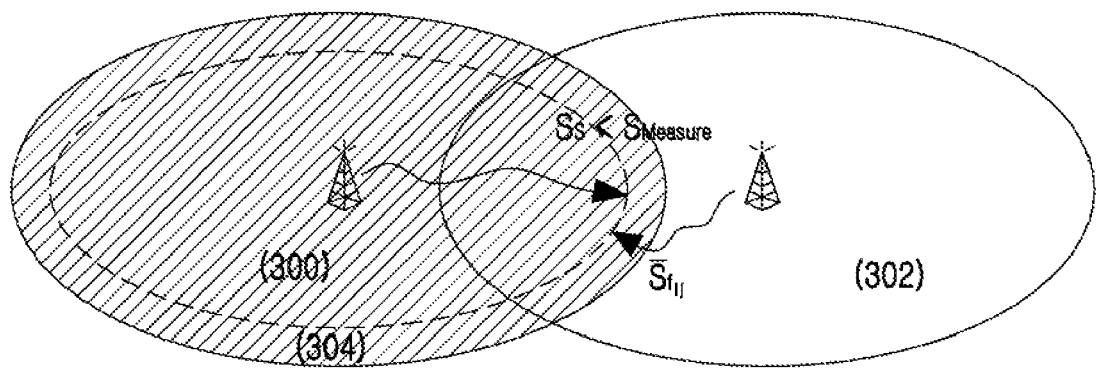
FIGS. 3A, 3B and 3C are diagrams for illustrating an inter-RAT/frequency cell of which a type is classified into an HN and an ON on the basis of a measurement report of a User Equipment (UE) in a wireless communication system according to an exemplary embodiment of the present invention.
Figure 3B:
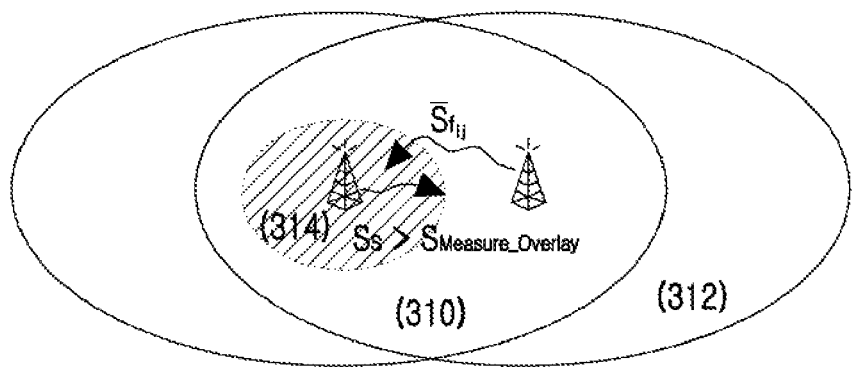
Figure 3C:
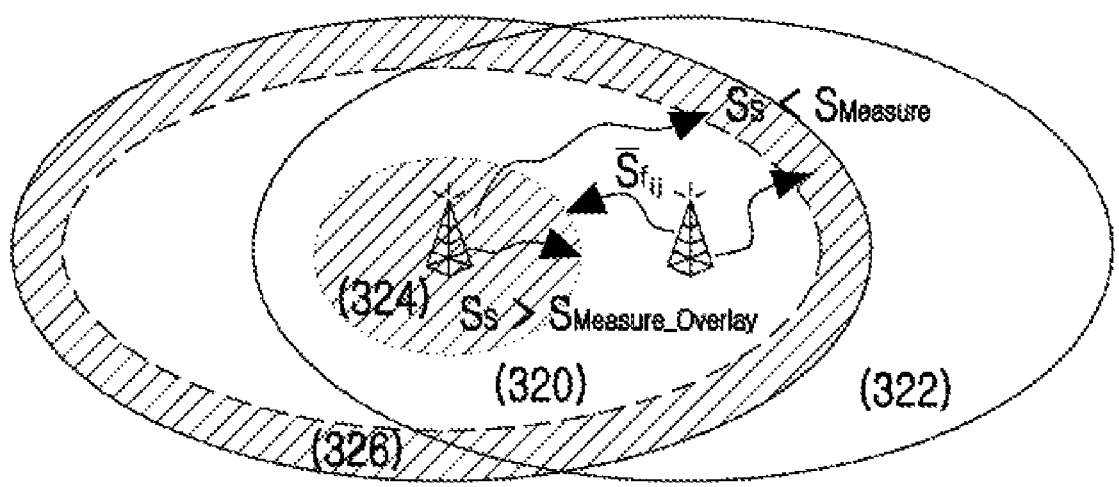

FIGS. 3A, 3B and 3C are diagrams for illustrating an inter-RAT/frequency cell of which a type is classified into an HN and an ON on the basis of a measurement report of a User Equipment (UE) in a wireless communication system according to an exemplary embodiment of the present invention.

Referring to FIG. 3A, among the inter-RAT/frequency cells reported by the UE in a region where a serving cell's signal quality Ss is less than $S_{Measure}$ (hereinafter, referred to as an HN region), a cell having the signal quality $\overline{S}_{f_{ij}}$ greater than a reference value $ADD_H$ is defined as an HN. For example, as illustrated in FIG. 3A, among inter-RAT/frequency cells 302 reported by the UE in a region 304 where a signal quality Ss of a serving cell 300 is less than $S_{Measure}$, a cell of which the signal quality $\overline{S}_{f_{ij}}$ is greater than the reference value $ADD_H$ is defined as the HN.

Referring to FIG. 3B, among the inter-RAT/frequency cells reported by the UE in a region where a serving cell's signal quality Ss is greater than $S_{Measure\_Overlay}$ (hereinafter, referred to as an ON region), a cell of which the signal quality $\overline{S}_{f_{ij}}$ is greater than a reference value $ADD_V$ is defined as an ON. For example, as illustrated in FIG. 3B, among inter-RAT/frequency cells 312 reported by the UE in a region 314 where a signal quality Ss of a serving cell 310 is greater than $S_{Measure\_Overlay}$, a cell of which the signal quality $\overline{S}_{f_{ij}}$ is greater than the reference value $ADD_V$ is defined as the ON.

Referring to FIG. 3C, among the inter-RAT/frequency cells reported by the UE in both the HN region and the ON region, a cell of which the signal quality $\overline{S}_{f_{ij}}$ exceeds both the reference values $ADD_H$ and $ADD_V$ is also defined as the ON. For example, as illustrated in FIG. 3C, among inter-RAT/frequency cells 322 reported by the UE in both a region 326 where a signal quality Ss of a serving cell 320 is less than $S_{Measure}$ and a region 324 where the signal quality Ss of the serving cell 320 is great than $S_{Measure\_Overlay}$, a cell of which the signal quality $\overline{S}_{f_{ij}}$ exceeds both the reference values $ADD_H$ and $ADD_V$ is also defined as the ON.

FIGS. 4A and 4B illustrate configurations of an inter-RAT/frequency Neighbor Relation Table (NRT) in a wireless communication system according to an exemplary embodiment of the present invention.

According to an exemplary embodiment of the present invention, the BS and an Operation, Administration and Maintenance (OAM) unit manage an inter-RAT/frequency Neighbor Relation Table (NRT). The NRT basically includes a Neighbor Relation (NR) field, a Target Cell Identifier (TCI) field, a No Remove field, a No HandOver (HO) field, and a No X2 field. The NR field indicates an index of a cell included in the NRT. The TCI field indicates an identifier of the cell included in the NRT. In this case, the cell included in the NRT is the HN by default. The No Remove field indicates an NR which must not be deleted by the BS from the NRT. The No HO field indicates an NR which must not be used for a handover purpose by the BS. The No X2 field indicates an NR which must not use an X2 interface for an initiate procedure with respect to the BS. According to an exemplary embodiment of the present invention, an ON field is added to the NRT to identify a cell type according to a policy of the BS. The ON field is checked/unchecked according to whether the identified cell type is the ON. If the ON field is checked, it implies that a corresponding cell is the ON and a neighbor that may be effectively used for load balancing/cell outage compensation, etc., in addition to mobility guarantee. For example, FIG. 4A illustrates an inter-frequency NRT configuration, and FIG. 4B illustrates an inter-RAT NRT configuration. Herein, when the BS reports NR modification to the OAM, the OAM may accept this and then modify an NR. In this case, if a specific NR is intended to be used for load balancing/cell outage compensation when load balancing or cell outage occurs with respect to the NR, an ON field of the NR may be checked. When the OAM or the BS selects a candidate neighbor for cell outage compensation, the NR of which the ON field is checked may be used as an initial candidate neighbor.

Figure 5:
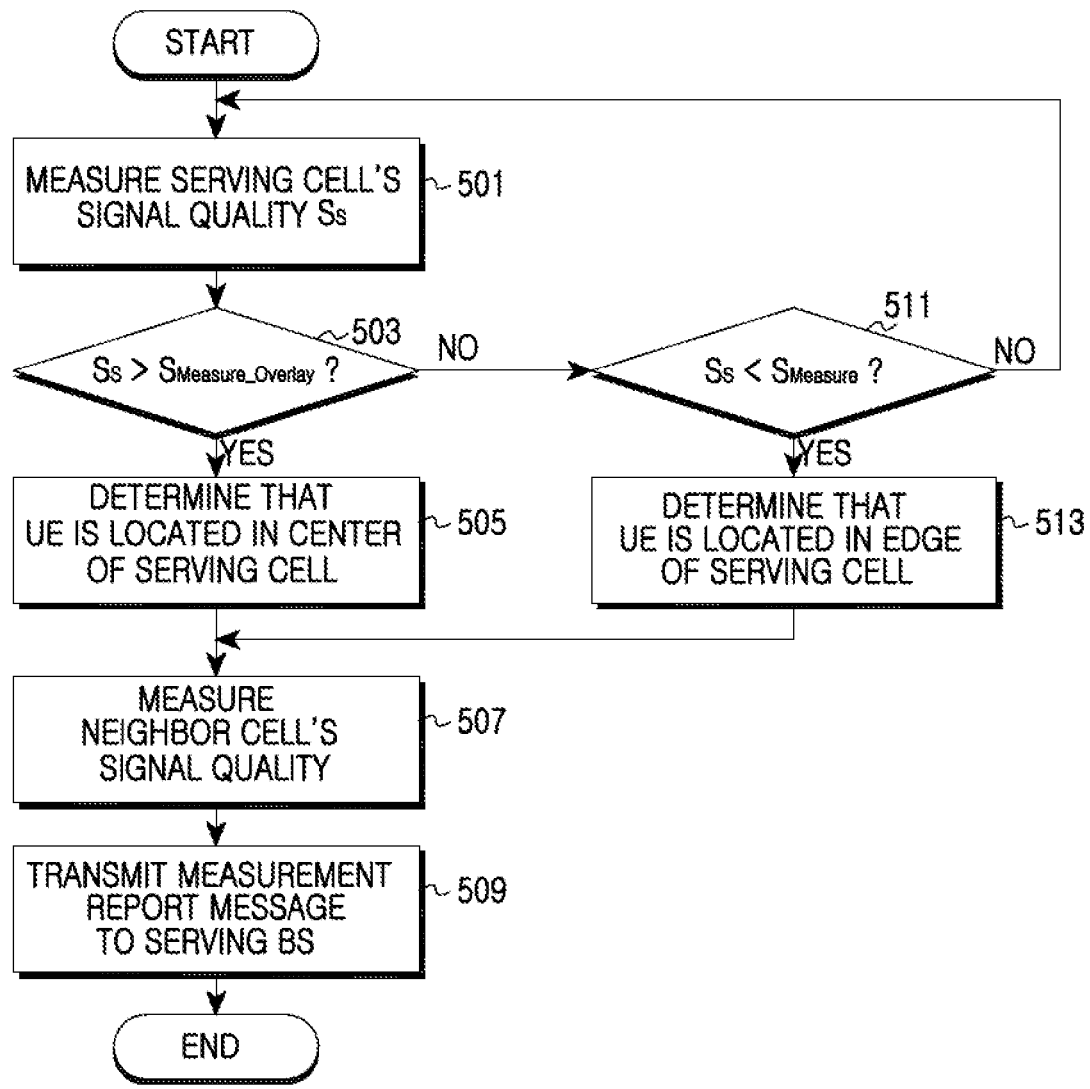
FIG. 5 is a flowchart illustrating a method of measuring signal qualities of inter-RAT/frequency cells and reporting a measurement result by a UE in a wireless communication system according to an exemplary embodiment of the present invention.

FIG. 5 is a flowchart illustrating a method of measuring signal qualities of inter-RAT/frequency cells and reporting a measurement result by a UE in a wireless communication system according to an exemplary embodiment of the present invention.

Referring to FIG. 5, the UE measures a serving cell's signal quality $S_S$ in step 501, and compares the measured serving cell's signal quality $S_S$ with a reference value $S_{Measure\_Overlay}$ in step 503 to determine whether the measured serving cell's signal quality $S_S$ is greater than the reference value $S_{Measure\_Overlay}$. In this case, the reference value $S_{Measure\_Overlay}$ is a reference value for identifying an ON which is one type of the inter-RAT/frequency cells defined in the present invention. If the serving cell's signal quality $S_S$ is greater than the reference value $S_{Measure\_Overlay}$, the UE may perform a neighbor cell search and report the search result to a BS.

If it is determined in step 503 that the measured serving cell's signal quality $S_S$ is greater than the reference value $S_{Measure\_Overlay}$, the UE determines that it is located in the center of the serving cell and also determines that a neighbor cell measured in the center of the serving cell is an overhead cell in step 505. In step 507, the UE measures a neighbor cell's signal quality. In step 509, the UE generates a measurement report message including the measurement result of the neighbor cell's signal quality and transmits the generated measurement report message to the serving BS.

Otherwise, if it is determined in step 503 that the measured serving cell's signal quality $S_S$ is less than or equal to the reference value $S_{Measure\_Overlay}$, the UE compares the measured serving cell's signal quality $S_s$ with a reference value $S_{Measure}$, and determines whether the measured serving cell's signal quality $S_S$ is less than the reference value $S_{Measure}$ in step 511. In this case, the reference value $S_{Measure}$ is a reference value for identifying an HN which is one type of inter-RAT/frequency cells defined according to a exemplary embodiment of the present invention. If the serving cell's signal quality $S_s$ is less than the reference value $S_{Measure}$, the UE may perform a neighbor cell search and report the search result to the BS.

If it is determined in step 511 that the measured serving cell's signal quality $S_S$ is less than the reference value $S_{Measure}$, the UE determines that it is located in the edge of the serving cell and also determines that the measured neighbor cell is the HN in step 513, and measures the neighbor cell's signal quality in step 507. In step 509, the UE generates a measurement report message including the measurement result of the neighbor cell's signal quality and transmits the generated measurement report message to the serving BS.

Otherwise, if it is determined in step 511 that the measured serving cell's signal quality $S_S$ is greater than or equal to the reference value $S_{Measure}$, returning to step 501, the subsequent steps are repeated.

Thereafter, the procedure of FIG. 5 ends.

Figure 6:
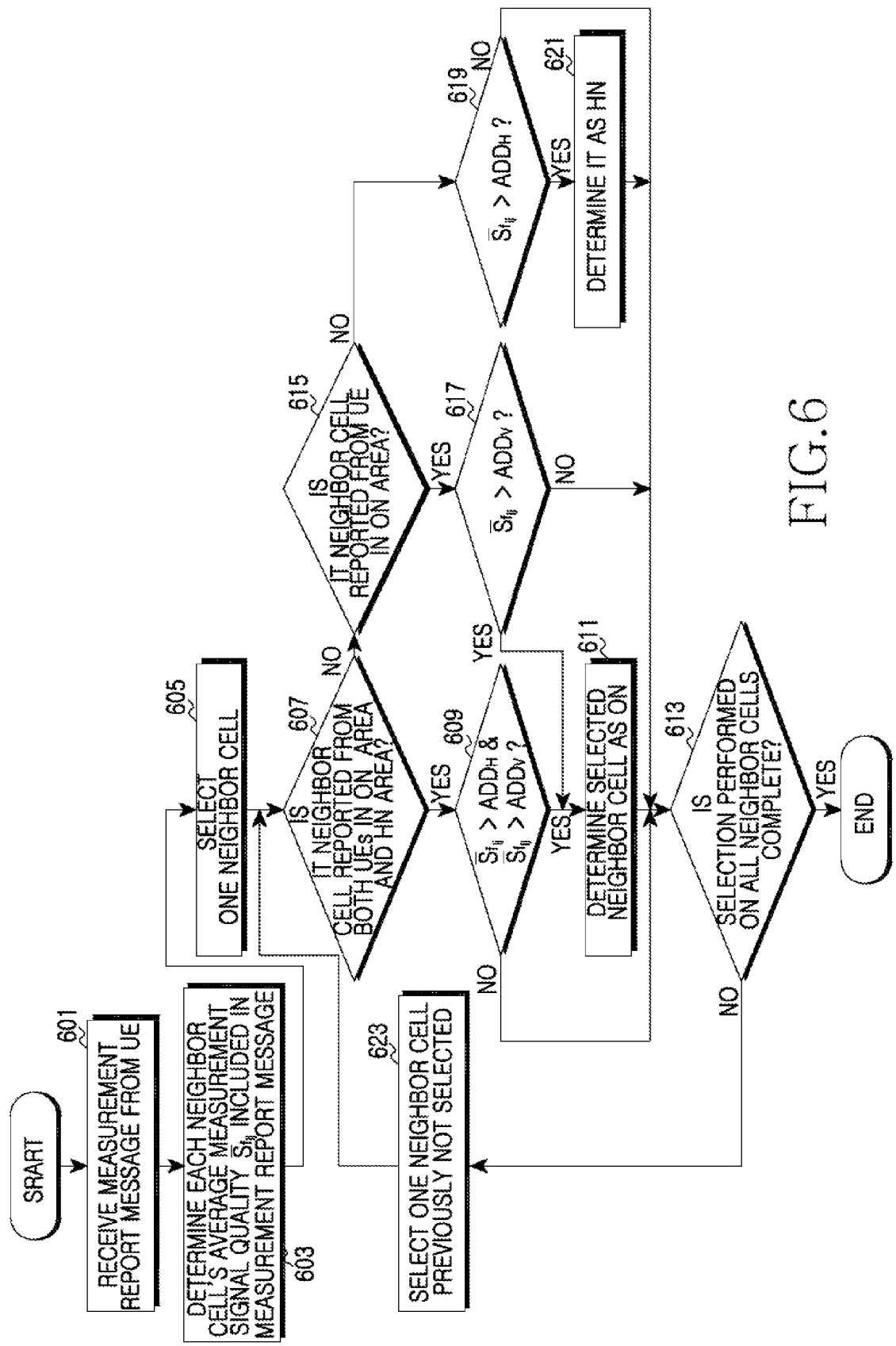
FIG. 6 is a flowchart illustrating a method of receiving a measurement report by a Base Station (BS) from a UE and identifying a type of inter-RAT/frequency cells on the basis of a received measurement report in a wireless communication system according to an exemplary embodiment of the present invention.

FIG. 6 is a flowchart illustrating a method of receiving a measurement report by a BS from a UE and identifying a type of inter-RAT/frequency cells on the basis of a received measurement report in a wireless communication system according to an exemplary embodiment of the present invention.

Referring to FIG. 6, the BS receives a measurement report message from UEs in step 601. Herein, the received measurement report message includes a result obtained by measuring a neighbor cell's signal quality.

In step 603, the BS determines each neighbor cell's average measurement signal quality $\overline{S}_{f_{ij}}$ by using each neighbor cell's signal quality included in the measurement report message received from the UEs.

In step 605, the BS selects one neighbor cell among the neighbor cells reported by using the measurement report message.

In step 607, the BS determines whether the selected neighbor cell is a neighbor cell reported from both UEs in an ON area and an HN area.

If it is determined in step 607 that the selected neighbor cell is the neighbor cell reported from both the UEs in the ON area and the HN area, the BS determines whether a selected neighbor cell's signal quality $\overline{S}_{f_{ij}}$ is greater than a reference value $ADD_H$ and is also greater than a reference value $ADD_V$ in step 609.

If it is determined in step 609 that the selected neighbor cell's signal quality $\overline{S}_{f_{ij}}$ is greater than the reference value $ADD_H$ and is also greater than the reference value $ADD_V$, the BS determines the selected neighbor cell as an ON in step 611. In step 613, the BS determines whether selection is complete for all neighbor cells reported by using the measurement report message.

Otherwise, if it is determined in step 609 that the selected neighbor cell's signal quality $\overline{S}_{f_{ij}}$ is less than or equal to the reference value $ADD_H$ or is less than or equal to the reference value $ADD_V$, the procedure directly proceeds to step 613.

If it is determined in step 613 that selection is complete for all neighbor cells reported by using the measurement report message, the procedure of FIG. 6 ends.

Otherwise, if it is determined in step 613 that selection is not complete for all neighbor cells reported by using the measurement report message, the BS selects one neighbor cell which is previously not selected among the neighbor cells reported by using the measurement report message in step 623. Then, returning to step 607, the subsequent steps are repeated.

On the other hand, if it is determined in step 607 that the selected neighbor cell is not the neighbor cell reported from both the UEs in the ON area and the HN area, the BS determines whether the selected neighbor cell is the neighbor cell reported from the UE in the ON area in step 615.

If it is determined in step 615 that the selected neighbor cell is the neighbor cell reported from the UE in the ON area, the BS determines whether the selected neighbor cell's signal quality $\overline{S}_{f_{ij}}$ is greater than the reference value $ADD_V$ in step 617.

If it is determined in step 617 that the selected neighbor cell's signal quality $\overline{S}_{f_{ij}}$ is greater than the reference value $ADD_V$, the BS determines the selected neighbor cell as the ON in step 611, and proceeds to step 613.

Otherwise, if it is determined in step 617 that the selected neighbor cell's signal quality $\overline{S}_{f_{ij}}$ is less than or equal to the reference value $ADD_V$, the procedure directly proceeds to step 613.

Meanwhile, if it is determined in step 615 that the selected neighbor cell is the neighbor cell reported from the UE in the HN area, the BS determines whether the selected neighbor cell's signal quality $\overline{S}_{f_{ij}}$ is greater than the reference value $ADD_H$ in step 619.

If it is determined in step 619 that the selected neighbor cell's signal quality $\overline{S}_{f_{ij}}$ is greater than the reference value $ADD_H$, the selected neighbor cell is determined as an HN in step 621, and proceeds to step 613.

Otherwise, if it is determined in step 619 that the selected neighbor cell's signal quality $\overline{S}_{f_{ij}}$ is less than or equal to the reference value $ADD_H$, the procedure directly proceeds to step 613.

Thereafter, the procedure of FIG. 6 ends.

Figure 7:
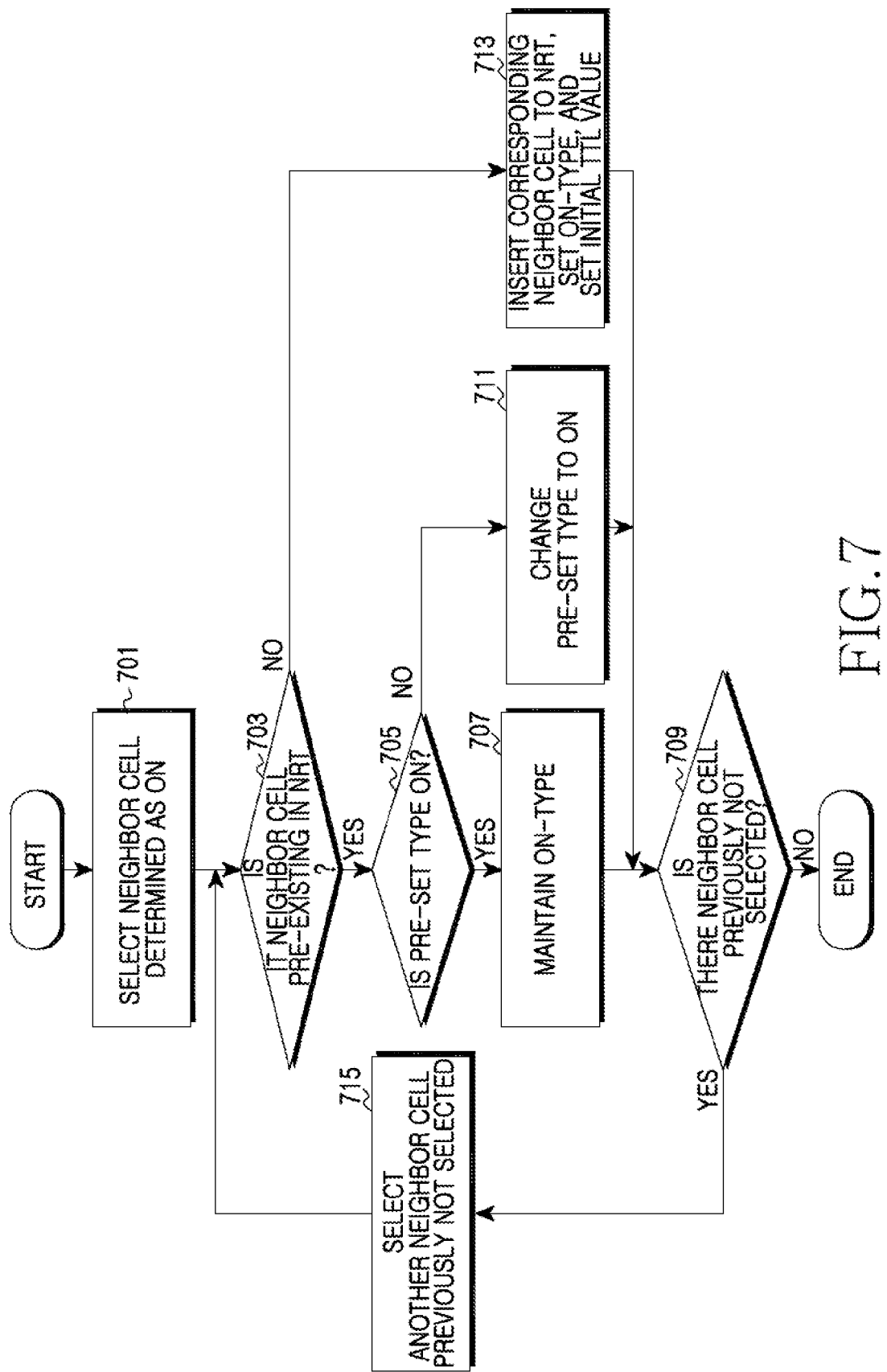
FIG. 7 is a flowchart illustrating a method of adding inter-RAT/frequency cells determined as an ON type to an NRT by a BS in a wireless communication system according to an exemplary embodiment of the present invention.

FIG. 7 is a flowchart illustrating a method of adding inter-RAT/frequency cells determined as an ON type to an NRT by a BS in a wireless communication system according to an exemplary embodiment of the present invention.

Referring to FIG. 7, in step 701, on the basis of a measurement report message received from UEs, the BS determines a type (i.e., ON or HN) of neighbor cells reported by using the measurement report message, and selects one neighbor cell among neighbor cells determined as the ON type.

In step 703, the BS determines whether the selected neighbor cell is a neighbor cell pre-existing in the NRT.

If it is determined in step 703 that the selected neighbor cell is the neighbor cell pre-existing in the NRT, the BS determines whether the pre-set type of the neighbor cell in the NRT is the ON type in step 705.

If it is determined in step 705 that the pre-set type of the neighbor cell is the ON type, the BS maintains the pre-set type of the neighbor cell to the ON type in step 707. In step 709, the BS determines whether there is a neighbor cell previously not selected among the neighbor cells determined as the ON type.

If it is determined in step 709 that there is the neighbor cell previously not selected among the neighbor cells determined as the ON type, the BS selects another neighbor cell previously not selected among the neighbor cells determined as the ON type in step 715, and then returning to step 703, the subsequent steps are repeated.

Otherwise, if it is determined in step 709 that there is no neighbor cell previously not selected among the neighbor cells determined as the ON type, the procedure of FIG. 7 ends.

Meanwhile, if it is determined in step 705 that the pre-set type of the neighbor cell is the HN type, the BS changes the pre-set type of the neighbor cell to the ON type in step 711, and then proceeds to step 709.

Otherwise, if it is determined in step 703 that the selected neighbor cell is the neighbor cell not pre-existing in the NRT, the BS inserts the neighbor cell in the NRT, and determines the type of the neighbor cell to the ON type in step 713. Further, in step 713, the BS initially sets a Time Tracking Loop (TTL) value of the selected neighbor cell to a maximum value $TTL_{max}$, and determines other attributes of the selected cell. Then, the procedure proceeds to step 709. As illustrated in FIG. 4, the attributes may be whether the cell is a cell which must not be deleted from the NRT by the BS, whether the cell is a cell which must not be used for the purpose of a handover by the BS, etc., and optionally (only for a case of using an Evolved UMTS Terrestrial Radio Access Network (E-UTRAN)), whether the cell is a cell which must not use an X2 interface for an initial process with respect to the BS.

Thereafter, the procedure of FIG. 7 ends.

Figure 8:
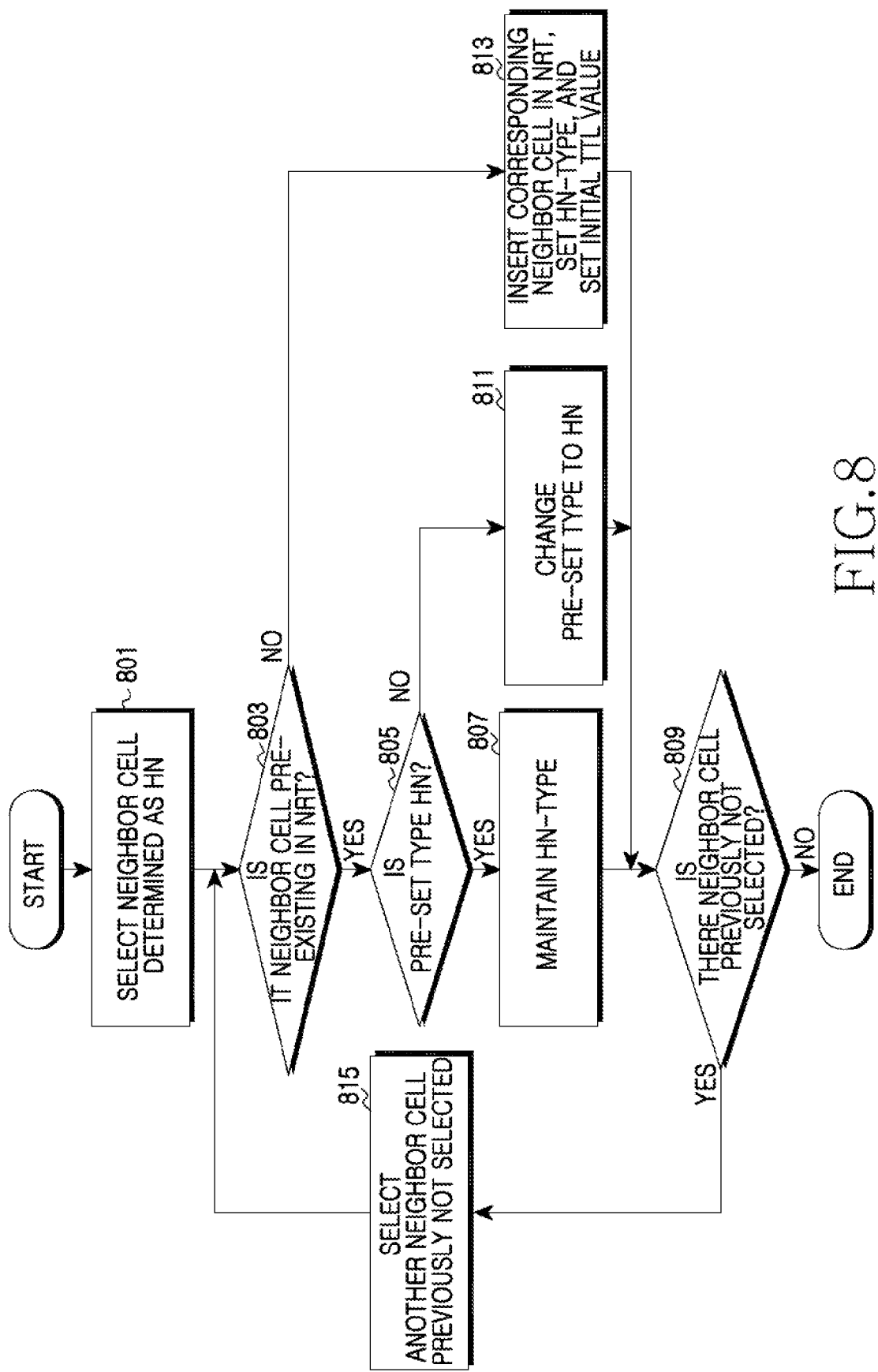
FIG. 8 is a flowchart illustrating a method of adding inter-RAT/frequency cells determined as an HN type to an NRT by a BS in a wireless communication system according to an exemplary embodiment of the present invention.

FIG. 8 is a flowchart illustrating a method of adding inter-RAT/frequency cells determined as an HN type to an NRT by a BS in a wireless communication system according to an exemplary embodiment of the present invention.

Referring to FIG. 8, in step 801, on the basis of a measurement report message received from UEs, the BS determines a type (i.e., ON or HN) of neighbor cells reported by using the measurement report message, and selects one neighbor cell among neighbor cells determined as the HN type.

In step 803, the BS determines whether the selected neighbor cell is a neighbor cell pre-existing in the NRT.

If it is determined in step 803 that the selected neighbor cell is the neighbor cell pre-existing in the NRT, the BS determines whether the pre-set type of the neighbor cell in the NRT is the HN type in step 805.

If it is determined in step 805 that the pre-set type of the neighbor cell is the HN type, the BS maintains the pre-set type of the neighbor cell to the HN type in step 807. In step 809, the BS determines whether there is a neighbor cell previously not selected among the neighbor cells determined as the HN type.

If it is determined in step 809 that there is the neighbor cell previously not selected among the neighbor cells determined as the HN type, the BS selects another neighbor cell previously not selected among the neighbor cells determined as the HN type in step 815, and then returning to step 803, the subsequent steps are repeated.

Otherwise, if it is determined in step 809 that there is no neighbor cell previously not selected among the neighbor cells determined as the HN type, the procedure of FIG. 8 ends.

Meanwhile, if it is determined in step 805 that the pre-set type of the neighbor cell is the ON type, the BS changes the pre-set type of the neighbor cell to the HN type in step 811 and then proceeds to step 809.

Otherwise, if it is determined in step 803 that the selected neighbor cell is the neighbor cell not pre-existing in the NRT, the BS inserts the neighbor cell to the NRT, and determines the type of the neighbor cell to the HN type in step 813. Further, in step 813, the BS initially sets a Time Tracking Loop (TTL) value of the selected neighbor cell to a maximum value $TTL_{max}$, and determines other attributes of the selected cell. Then, the procedure proceeds to step 809. As illustrated in FIG. 4, the attributes may be whether the cell is a cell which must not be deleted from the NRT by the BS, whether the cell is a cell which must not be used for the purpose of a handover by the BS, etc., and optionally (only for a case of using an E-UTRAN), whether the cell is a cell which must not use an X2 interface for an initial process with respect to the BS.

Thereafter, the procedure of FIG. 8 ends.

Figure 9:
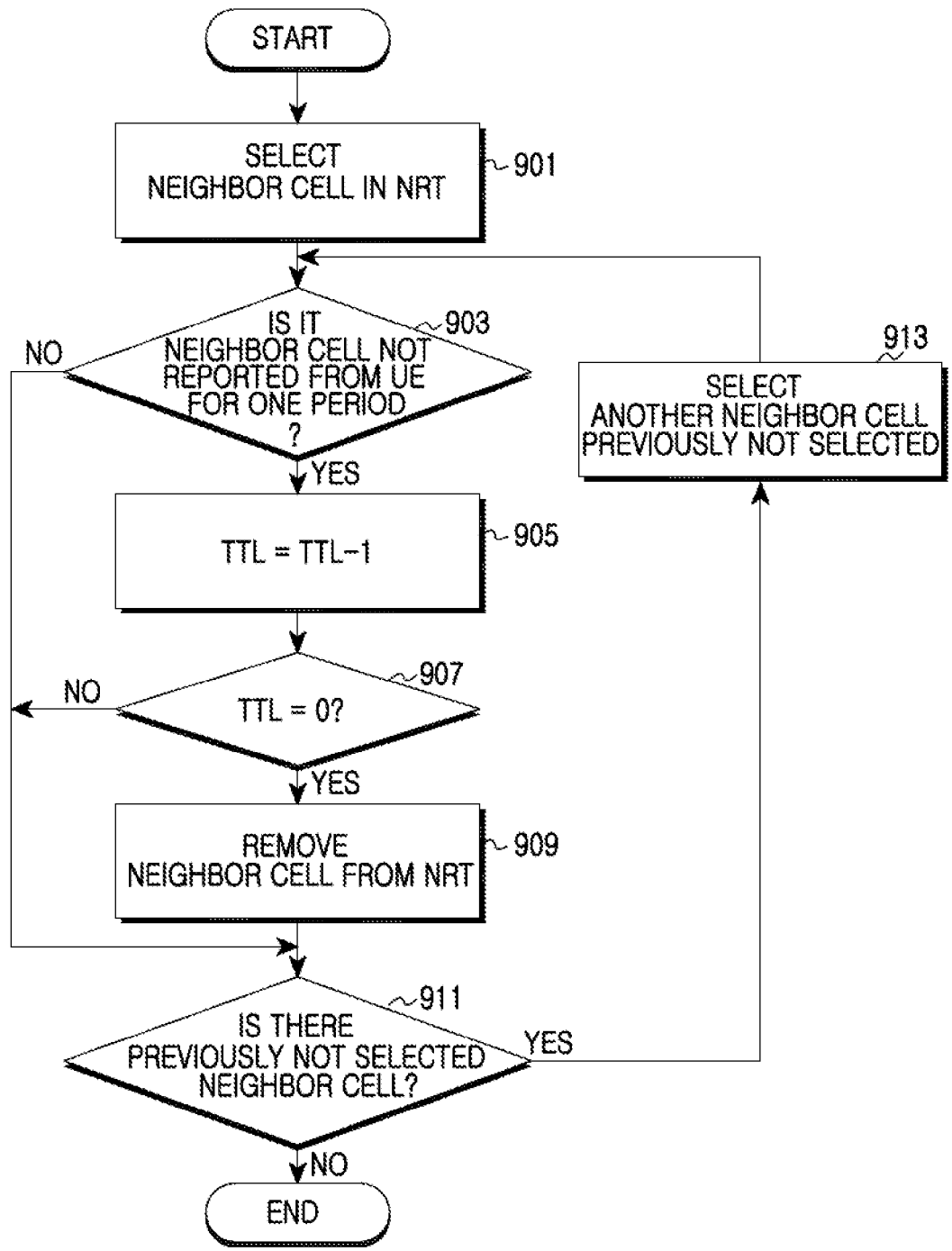
FIG. 9 is a flowchart illustrating a method of deleting inter-RAT/frequency cells from an NRT by a BS in a wireless communication system according to an exemplary embodiment of the present invention.

FIG. 9 is a flowchart illustrating a method of deleting inter-RAT/frequency cells from an NRT by a BS in a wireless communication system according to an exemplary embodiment of the present invention.

Referring to FIG. 9, the BS selects one neighbor cell in the NRT in step 901, and determines whether the selected cell is a neighbor cell which is not reported from a UE for one period in step 903.

If it is determined in step 903 that the selected neighbor cell is the neighbor cell not reported from the UE for one period, the BS updates a TTL value for the selected neighbor cell to a value one less than its own value in step 905, and determines whether the updated TTL value is 0 in step 907.

$$\text{if } \sum_K 1_{f_{ij}k} = 0, \quad TTL_{f_{ij}} -- \quad (3)$$

$$\text{else } TTL_{f_{ij}} = TTL_{max}$$

In Equation (3), K denotes a set of active users, $f_{ij}$ denotes a cell operating in a carrier frequency i with a PCI j, and $1_{f_{ij}}$ is an indicator function and has a value of '1' or '0' to indicate whether the cell $f_{ij}$ is reported from the user k. That is, if the cell $f_{ij}$ is a neighbor cell not reported from the UE for one period, the BS updates a TTL value $TTL_{f_{ij}}$ of the cell $f_{ij}$ to a value one less than its own value, and otherwise, maintains the TTL value $TTL_{f_{ij}}$ of the cell $f_{ij}$ to a maximum value $TTL_{max}$ defined in the initial setup.

If it is determined in step 907 that the updated TTL value is 0, the BS removes the selected neighbor cell from the NRT in step 909. In step 911, the BS determines whether there is a neighbor cell previously not selected.

Otherwise, if it is determined in step 907 that the updated TTL value is not 0, the procedure directly proceeds to step 911.

Meanwhile, if is determined in step 903 that the selected neighbor cell is not the neighbor cell not reported from the UE for one period, the procedure directly proceeds to step 911.

In step 911, the BS determines whether the previously not selected neighbor cell exists in the NRT.

If it is determined in step 911 that the previously not selected neighbor cell exists in the NRT, the BS selects another neighbor cell previously not selected in the NRT in step 913. Then, returning to step 903, the subsequent steps are repeated.

Otherwise, if it is determined in step 911 that the previously not selected neighbor cell does not exist in the NRT, the procedure of FIG. 9 ends.

Figure 10:
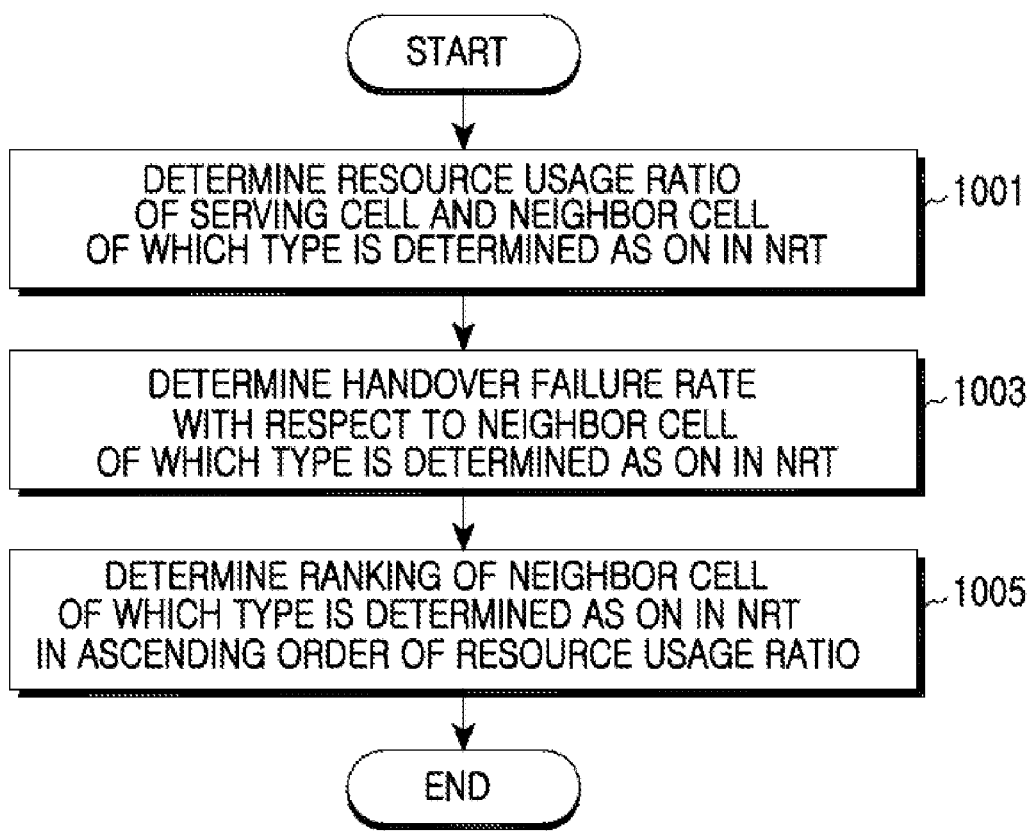
FIG. 10 is a flowchart illustrating a method of determining a ranking of inter-RAT/frequency cells determined as an ON type by a BS in a mobile communication system according to an exemplary embodiment of the present invention.

FIG. 10 is a flowchart illustrating a method of determining a ranking of inter-RAT/frequency cells determined as an ON type by a BS in a mobile communication system according to an exemplary embodiment of the present invention.

Referring to FIG. 10, in step 1001, the BS determines a resource usage ratio of a serving cell and a neighbor cell of which a type is determined as an ON in an NRT.

In step 1003, the BS determines a handover failure rate with respect to the neighbor cell of which the type is determined as the ON in the NRT.

In step 1005, the BS determines a ranking of the neighbor cell of which the type is determined as the ON in the NRT in an ascending order of the resource usage ratio, by using the resource usage ratio of the serving cell and the neighbor cell of which the type is determined as the ON and the handover failure rate with respect to the neighbor cell of which the type is determines as the ON.

The ranking of the neighbor cell of which the type is determined as the ON in the NRT may be determined by using Equation (4) below.

$$\omega_{f_{ij}}^V = \alpha\left(\frac{R_n}{R_{f_{ij}}}\right) + \beta(1 - Y_{f_{ij}}) \quad (4)$$

wherein $\alpha + \beta = 1$, $(0 \le \alpha, \beta \le 1)$, $(0 \le R_{f_{ij}}, R_n \le 1)$ In Equation (4), $R_n$ denotes a resource usage ratio of a serving cell n, and $R_{f_{ij}}$ denotes a resource usage ratio of a cell $f_{ij}$. $Y_{f_{ij}}$ denotes a handover failure rate with respect to the cell $f_{ij}$. $\alpha$ and $\beta$ denote weights.

Thereafter, the procedure of FIG. 10 ends.

Figure 11:
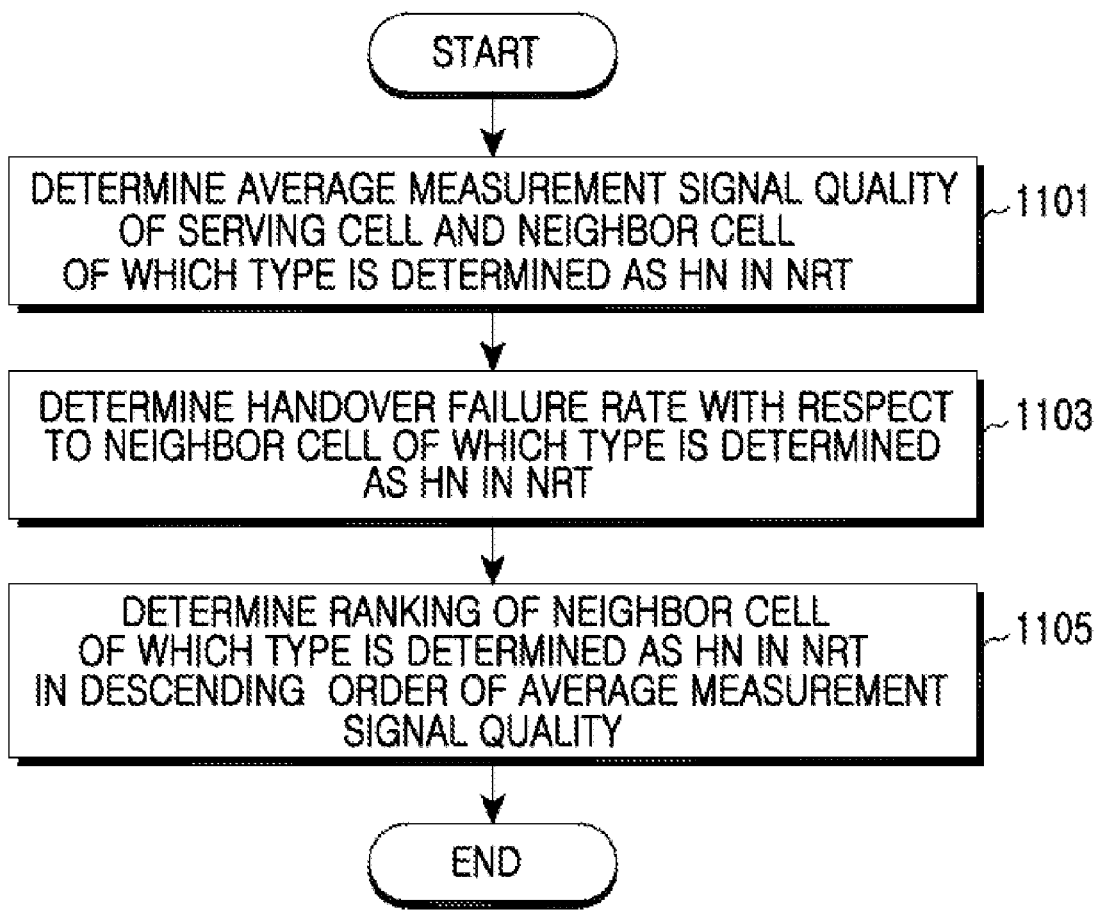
FIG. 11 is a flowchart illustrating a method of determining a ranking of inter-RAT/frequency cells determined as an HN type by a BS in a wireless communication system according to an exemplary embodiment of the present invention.

FIG. 11 is a flowchart illustrating a method of determining a ranking of inter-RAT/frequency cells determined as an HN type by a BS in a wireless communication system according to an exemplary embodiment of the present invention.

Referring to FIG. 11, the BS determines an average measurement signal quality of a serving cell and a neighbor cell of which a type is determined as an HN in an NRT in step 1101.

In step 1103, the BS determines a handover failure rate with respect to the neighbor cell of which the type is determined as the HN in the NRT.

In step 1105, the BS determines the ranking of the neighbor cell of which the type is determined as the HN in the NRT in a descending order of the average measurement signal quality, by using the average measurement signal quality of the serving cell and the neighbor cell of which the type is determined as the HN in the NRT and the handover failure rate with respect to the neighbor cell of which the type is determined as the HN in the NRT.

The ranking of the neighbor cell of which the type is determined as the HN in the NRT may be determined by using Equation (5) below.

$$\omega_{f_{ij}}^H = \alpha\left(\frac{\overline{S}_{f_{ij}}}{\overline{S}_n}\right) + \beta(1 - Y_{f_{ij}}) \text{ wherein } \alpha + \beta = 1, (0 \le \alpha, \beta \le 1) \quad (5)$$

In Equation (5), $\overline{S}_n$ denotes an average measurement signal quality of a serving cell n, and $\overline{S}_{f_{ij}}$ denotes an average measurement signal quality of a cell $f_{ij}$. $Y_{f_{ij}}$ denotes a handover failure rate with respect to the cell $f_{ij}$. $\alpha$ and $\beta$ denote weights.

Figure 12:
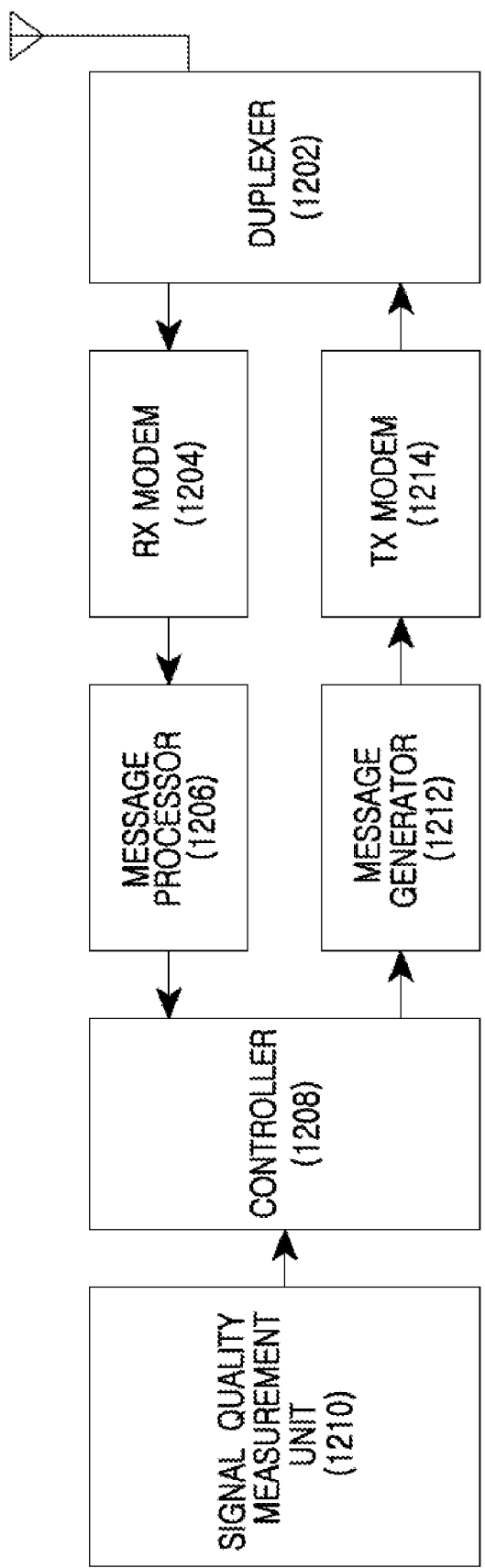
FIG. 12 is a block diagram illustrating a structure of a UE in a wireless communication system according to an exemplary embodiment of the present invention.

FIG. 12 is a block diagram illustrating a structure of a UE in a wireless communication system according to an exemplary embodiment of the present invention.

Referring to FIG. 12, the UE includes a duplexer 1202, a receive (Rx) modem 1204, a message processor 1206, a controller 1208, a signal quality measurement unit 1210, a message generator 1212, and a transmit (Tx) modem 1214.

The duplexer 1202 transmits a Tx signal provided from the Tx modem 1214 through an antenna according to a duplexing method, and provides an Rx signal from the antenna to the Rx modem 1204.

The Rx modem 1204 restores data from the signal provided from the duplexer 1202 and delivers the restored data to the message processor 1206. For example, the Rx modem 1204 includes an RF reception block, a demodulation block, a channel decoding block, etc. The RF reception block includes a filter, an RF precoder, etc. When the wireless communication system uses an Orthogonal Frequency Division Multiplexing (OFDM) scheme, the demodulation block includes a Fast Fourier Transform (FFT) operator for extracting data carried on each subcarrier. The channel decoding block includes a demodulator, a deinterleaver, a channel decoder, etc.

The message processor 1206 extracts control information from the signal provided from the Rx modem 1204 and provides the control information to the controller 1208.

The controller 1208 controls an overall communication operation of the UE. More particularly, the controller 1208 receives a measurement result of neighbor cell's signal quality from the signal quality measurement unit 1210 and thus controls the message generator 1212 to generate a measurement report message including the measurement result of the neighbor cell's signal quality.

The signal quality measurement unit 1210 measures a serving cell's signal quality. If the measured serving cell's signal quality Ss is greater than a reference value $S_{Measure\_Overlay}$ or less than a reference value $S_{Measure}$, the signal quality measurement unit 1210 measures the neighbor cell's signal quality and provides it to the controller 1208.

The message generator 1212 generates a message to be transmitted to a BS under the control of the controller 1208 and provides it to the Tx modem 1214. For example, the message generator 1212 generates a measurement report message and provides it to the Tx modem 1214. Herein, the measurement report message includes a measurement result of the neighbor cell's signal quality, which is transmitted to the serving BS via the Tx modem 1214.

The Tx modem 1214 converts Tx data or a message provided from the message generator 1212 into a format suitable for transmission using a radio resource and provides it to the duplexer 1202. For example, the Tx modem 1214 includes a channel coding block, a modulation block, an RF transmission block, etc. In this case, the channel coding block includes a modulator, an interleaver, a channel encoder, etc. When the wireless communication system uses an OFDM scheme, the modulation block includes an Inverse Fast Fourier Transform (IFFT) operator for mapping data to each subcarrier. The RF transmission block includes a filter, an RF precoder, etc.

In the aforementioned structure, the controller 1208 controls the message processor 1206, the signal quality measurement unit 1210, and the message generator 1212. That is, the controller 1208 may perform functions of the message processor 1206, the signal quality measurement unit 1210, and the message generator 1212. Although these elements are separately constructed in the present invention to explain their functions, this is for description purposes only. Therefore, in actual implementation, all of these elements may be processed by the controller 1208, or only some of these elements may be processed by the controller 1208.

Figure 13:
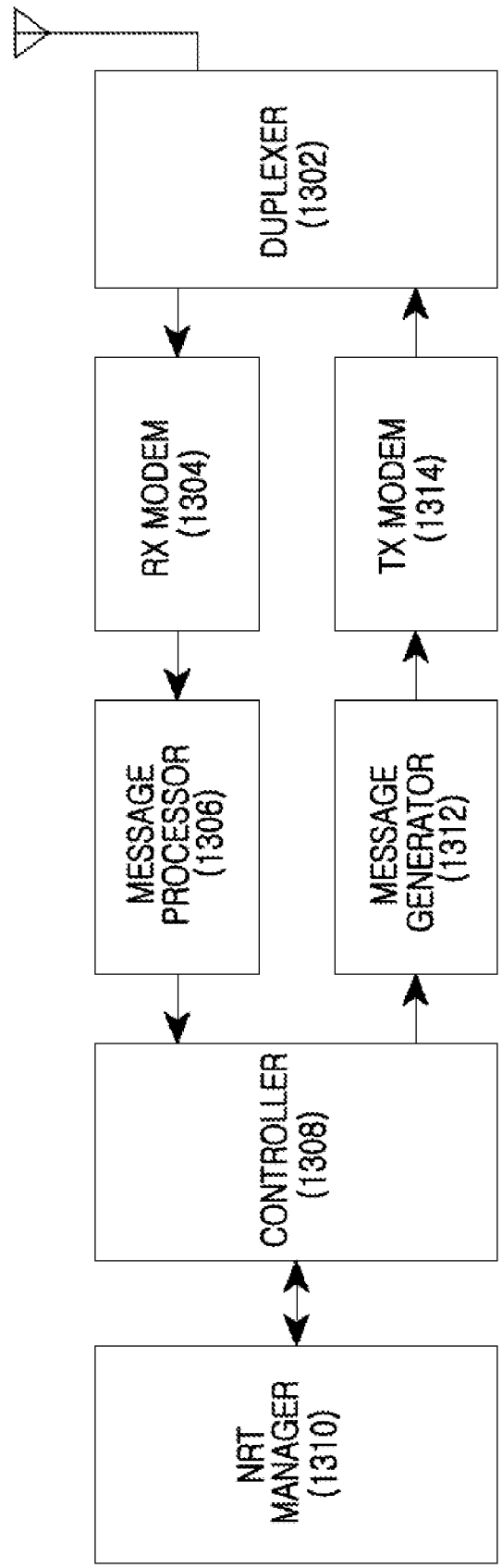
FIG. 13 is a block diagram illustrating a structure of a BS in a wireless communication system according to an exemplary embodiment of the present invention.

FIG. 13 is a block diagram illustrating a structure of a BS in a wireless communication system according to an exemplary embodiment of the present invention.

Referring to FIG. 13, the BS includes a duplexer 1302, an Rx modem 1304, a message processor 1306, a controller 1308, an NRT manager 1310, a message generator 1312, and a Tx modem 1314.

The duplexer 1302 transmits a Tx signal provided from the Tx modem 1314 through an antenna according to a duplexing method, and provides an Rx signal from the antenna to the Rx modem 1304.

The Rx modem 1304 restores data from the signal provided from the duplexer 1302 and delivers the restored data to the message processor 1306. For example, the Rx modem 1304 includes an RF reception block, a demodulation block, a channel decoding block, etc. The RF reception block includes a filter, an RF precoder, etc. When the wireless communication system uses an Orthogonal OFDM scheme, the demodulation block includes a Fast Fourier Transform (FFT) operator for extracting data carried on each subcarrier. The channel decoding block includes a demodulator, a deinterleaver, a channel decoder, etc.

The message processor 1306 extracts control information from the signal provided from the Rx modem 1304 and provides the control information to the controller 1308. For example, the message processor 1306 extracts a measurement result of the neighbor cell's signal quality from a measurement report message received from UEs and provides the measurement result to the controller 1308.

The controller 1308 controls an overall communication operation of the BS. More particularly, the controller 1308 receives the measurement result of the neighbor cell signal quality from the signal quality measurement unit 1306 and provides it to the NRT manager 1310 so as to control the NRT manager 1310 to configure an ANR by identifying a type of inter-RAT/frequency cells on the basis of the measurement report of the neighbor cell signal quality and to optimize the ANR by performing NR addition, NR removal, and NR ranking for each type of the inter-RAT/frequency cells.

The NRT manager 1310 receives the measurement result of the neighbor cell signal's quality from the controller 1308, configures the ANR by identifying the type of the inter-RAT/frequency cells on the basis of the measurement result, and optimizes the ANR by performing NR addition, NR removal, and NR ranking for each type of the inter-RAT/frequency cells.

The message generator 1312 generates a message to be transmitted to the UE under the control of the controller 1308 and provides it to the Tx modem 1314.

The Tx modem 1314 converts Tx data or a message provided from the message generator 1312 into a format suitable for transmission using a radio resource and provides it to the duplexer 1302. For example, the Tx modem 1314 includes a channel coding block, a modulation block, an RF transmission block, etc. In this case, the channel coding block includes a modulator, an interleaver, a channel encoder, etc. When the wireless communication system uses an OFDM scheme, the modulation block includes an Inverse Fast Fourier Transform (IFFT) operator for mapping data to each subcarrier. The RF transmission block includes a filter, an RF precoder, etc.

In the aforementioned structure, the controller 1308 controls the message processor 1306, the NRT manager 1310, and the message generator 1312. That is, the controller 1308 may perform functions of the message processor 1306, the NRT manager 1310, and the message generator 1312. Although these elements are separately constructed in the present invention to explain their functions, this is for description purposes only. Therefore, in actual implementation, all of these elements may be processed by the controller 1308, or only some of these elements may be processed by the controller 1308.

Meanwhile, when a handover of a service UE is requested after the BS configures and optimizes the NRT according to an exemplary embodiment of the present invention, the BS may search for an inter-RAT/frequency cell suitable for the requested handover purpose (i.e., mobility guarantee, load balancing/cell outage compensation), and may instruct the service UE to perform an inter-RAT/frequency handover to the found inter-RAT/frequency cell.

As describe above, an exemplary BS of the present invention may configure and optimize the NRT periodically on the basis of a measurement report of the UE, and when a typical handover-related event is triggered, if a target cell is not included in the NRT (i.e., if it is recognized as a new cell), the target cell may be inserted to the NRT and its type may be determined as an HN type.

In addition, as described above, an exemplary BS of the present invention may configure and optimize the NRT periodically on the basis of the measurement report of the UE, and thus may transmit information on a changed inter-RAT/frequency cell to a neighbor BS by including the information in an X2 setup request message or an X2 evolved NodeB (eNB) configuration update message.

For example, the X2 setup request message or the X2 eNB configuration update message may include a neighbor information field indicating information on the inter-RAT/frequency cell as shown in Table 1 below.

TABLE 1

| IE/Group Name | Presence | Semantics description |
| --- | --- | --- |
| Message Type | M | |
| Global eNB ID | M | |
| Served Cells | | This is all the eNB cells |
| >Served Cell Information | M | |
| Neighbor Information (EUTRAN) | | |
| >ECGI | M | E-UTRAN Cell Global Identifier of the neighbor cell |
| >PCI | M | Physical Cell Identifier of the neighbor cell |
| >EARFCN | M | DL EARFCN for FDD and EARFCN for TDD |
| Neighbor Information (CDMA2000) | | |
| >TYPE | | TYPE HRPD/1X |
| >ECGI | M | CDMA2000 Cell Global Identifier of the neighbor cell |
| >PCI | M | Physical Cell Identifier of the neighbor cell |
| >Frequency | M | CDMA2000 carrier frequency |
| >Frequency Band | M | Frequency band |
| Neighbor Information (UTRAN) | | |
| >ECGI | M | UTRA Cell Global Identifier of the neighbor cell |
| >PCI | M | Physical Cell Identifier of the neighbor cell |
| >UARFCN | M | UTRA-DL-CarrierFreq (For UTRA FDD: the field contains the downlink frequency (Nd) For UTRA TDD: the field contains the (Nt)) |
| Neighbor Information (GERAN) | | |
| >ECGI | M | UTRA Cell Global Identifier of the neighbor cell |
| >PCI | M | Physical Cell Identifier of the neighbor cell |
| >ARFCN | M | GERAN ARFCN of BCCH carrier |
| >band Indicator | M | Band Indicator |

According to exemplary embodiments of the present invention, a BS of a wireless communication system automatically recognizes inter-RAT/frequency cells, configures an ANR by identifying the inter-RAT/frequency cells on the basis of a handover purpose (i.e., mobility guarantee and load balancing/cell outage compensation), and optimizes the ANR by performing NR addition, NR removal, and NR ranking for each type of the inter-RAT/frequency cells. Therefore, there is an advantage in that the BS may effectively use the inter-RAT/frequency cells on the basis of the handover purpose. In addition, system Operation, Administration and Maintenance (OAM) costs may be reduced, and a system load may be reduced.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of configuring an Automatic Neighbor Relation (ANR) by a Base Station (BS) in a wireless communication system, the method comprising:
receiving a measurement report message for reporting a neighbor cell's signal quality from one or more User Equipments (UEs);
determining a neighbor cell, reported from a UE in an area where a serving cell's signal quality is greater than a first reference value, as an Overlay Neighbor (ON), among neighbor cells reported using the measurement report message; and
determining a neighbor cell, reported from a UE in an area where the serving cell's signal quality is less than a second reference value, as a Horizontal Neighbor (HN), among the neighbor cells reported using the measurement report message,
wherein the second reference value is set to a value smaller than the first reference value.

2. The method of claim 1, further comprising:
determining at least one of an average measurement signal quality and a maximum measurement signal quality of the neighbor cell, wherein the determining of the neighbor cell as the ON is performed when the at least one of the average measurement signal quality and the maximum measurement signal quality of the neighbor cell is greater than a third reference value, and further wherein the determining of the neighbor cell as the HN is performed when the at least one of the average measurement signal quality and the maximum measurement signal quality of the neighbor cell is greater than a fourth reference value.

3. The method of claim 2, wherein the determining of the at least one of the average measurement signal quality and the maximum measurement signal quality of the neighbor cell comprises using the following equations:

$$\overline{S}_{f_{ij}} = \frac{\sum_K S_{f_{ij}k} 1_{f_{ij}k}}{\sum_K 1_{f_{ij}k}} \text{ and } \overline{S}_{f_{ij}} = \max_K S_{f_{ij}k}$$

wherein, K denotes a set of active users, $f_{ij}$ denotes a cell operating in a carrier frequency i with a Physical Cell Identifier (PCI) j, and $S_{f_{ij}k}$ denotes a signal quality of the cell $f_{ij}$ measured by a user k, and $1_{f_{ij}k}$ is an indicator function and has a value of '1' or '0' to indicate whether the cell $f_{ij}$ is reported from the user k.

4. The method of claim 1, further comprising determining a neighbor cell reported both from the UE in the area where the serving cell's signal quality is greater than the first reference value and the UE in the area where the serving cell's signal quality is less than the second reference value as the ON, among the neighbor cells reported using the measurement report message.

5. The method of claim 1, further comprising:
inserting the neighbor cell determined as the ON or the HN to a Neighbor Relation Table (NRT); and
setting a type of the neighbor cell to an ON or HN type in the NRT according to the determination result.

6. The method of claim 5, further comprising:
initially setting a Time Tracking Loop (TTL) value for the neighbor cell if the neighbor cell is inserted to the NRT;
updating the TTL value of the neighbor cell to a value one less than its own value if the neighbor cell is not reported from the UE by using the measurement report message for a specific period; and
removing the neighbor cell from the NRT if the updated TTL value of the neighbor cell is 0.

7. The method of claim 1, further comprising:
determining a resource usage ratio of the neighbor cell and the serving cell if the neighbor cell is determined as the ON;
determining a handover failure rate with respect to the neighbor cell; and
determining a ranking of the neighbor cell in a Neighbor Relation Table (NRT) in an ascending order of the resource usage ratio by using the determined resource usage ratio of the neighbor cell and the serving cell and the handover failure rate with respect to the neighbor cell.

8. The method of claim 7, wherein the ranking of the neighbor cell is determined by using the following equation:

$$\omega_{f_{ij}}^V = \alpha \left( \frac{R_n}{R_{f_{ij}}} \right) + \beta(1 - Y_{f_{ij}})$$

wherein $\alpha + \beta = 1$, $(0 \le \alpha, \beta \le 1)$, $(0 \le R_{f_{ij}}, R_n \le 1)$ where $R_n$ denotes a resource usage ratio of a serving cell n, $R_{f_{ij}}$ denotes a resource usage ratio of a cell $f_{ij}$, $Y_{\theta_{ij}}$ denotes a handover failure rate with respect to the cell $f_{ij}$, and $\alpha$ and $\beta$ denote weights.

9. The method of claim 1, further comprising:
determining an average measurement signal quality of the neighbor cell and the serving cell if the neighbor cell is determined as the HN;
determining a handover failure rate with respect to the neighbor cell; and
determining a ranking of the neighbor cell in a Neighbor Relation Table (NRT) in a descending order of the average measurement signal quality by using the determined average measurement signal quality of the neighbor cell and the serving cell and the handover failure rate with respect to the neighbor cell.

10. The method of claim 9, wherein the ranking of the neighbor cell is determined by using the following equation:

$$\omega_{f_{ij}}^H = \alpha \left( \frac{\overline{S}_{f_{ij}}}{\overline{S}_n} \right) + \beta(1 - Y_{f_{ij}}) \text{ wherein } \alpha + \beta = 1, (0 \le \alpha, \beta \le 1)$$

where $\overline{S}_n$ denotes a average measurement signal quality of a serving cell n, $\overline{S}_{f_{ij}}$ denotes a average measurement signal quality of a cell $f_{ij}$, $Y_{f_{ij}}$ denotes a handover failure rate with respect to the cell $f_{ij}$, and $\alpha$ and $\beta$ denote weights.

11. The method of claim 1, further comprising:
at the request of a handover for mobility guarantee of the UE, searching for the neighbor cell determined as the HN in a Neighbor Relation Table (NRT) and instructing the UE to perform a handover to the found neighbor cell; and
at the request of a handover for at least one of load balancing of the UE and cell outage compensation, searching for the neighbor cell determined as the ON in the NRT and instructing the UE to perform a handover to the found neighbor cell.

12. A method of transmitting a measurement report message of a User Equipment (UE) in a wireless communication system, the method comprising:
measuring a serving cell's signal quality;
if at least one of the serving cell's signal quality is greater than a first reference value and the serving cell's signal quality is less than a second reference value, measuring a neighbor cell's signal quality and setting the second reference value to a value less than the first reference value; and
generating a measurement report message comprising the measured neighbor cell's signal quality.

13. The method of claim 12, further comprising transmitting the generated measurement report message to a serving Base Station (BS).

14. A Base Station (BS) apparatus for configuring an Automatic Neighbor Relation (ANR) in a wireless communication system, the apparatus comprising:

a reception modem for receiving a measurement report message for reporting a neighbor cell's signal quality from one or more User Equipments (UEs); and a Neighbor Relation Table (NRT) manager for determining a neighbor cell, reported from a UE in an area where a serving cell's signal quality is greater than a first reference value, as an Overlay Neighbor (ON) among neighbor cells reported using the measurement report message, and for determining a neighbor cell, reported from a UE in an area where the serving cell's signal quality is less than a second reference value, as a Horizontal Neighbor (HN) among the neighbor cells reported using the measurement report message, wherein the second reference value is set to a value smaller than the first reference value.

15. The apparatus of claim 14, wherein the NRT manager determines at least one or an average measurement signal quality and a maximum measurement signal quality of the neighbor cell, determines the neighbor cell as the ON when the at least one of the average measurement signal quality and the maximum measurement signal quality of the neighbor cell is greater than a third reference value, and determines the neighbor cell as the HN when the at least one of the average measurement signal quality and the maximum measurement signal quality of the neighbor cell is greater than a fourth reference value.

16. The apparatus of claim 15, wherein the NRT manager determines the at least one of the average measurement signal quality and the maximum measurement signal quality of the neighbor cell comprises using the following equations:

$$\overline{S}_{f_{ij}} = \frac{\sum_K S_{f_{ij}k} 1_{f_{ij}k}}{\sum_K 1_{f_{ij}k}} \text{ and } \overline{S}_{f_{ij}} = \max_K S_{f_{ij}k}$$

wherein, K denotes a set of active users, $f_{ij}$ denotes a cell operating in a carrier frequency i with a Physical Cell Identifier (PCI) j, and $S_{f_{ij}k}$ denotes a signal quality of the cell $f_{ij}$ measured by a user k, and $1_{f_{ij}k}$ is an indicator function and has a value of '1' or '0' to indicate whether the cell $f_{ij}$ is reported from the user k.

17. The apparatus of claim 14, wherein the NRT manager determines a neighbor cell reported both from the UE in the area where the serving cell's signal quality is greater than the first reference value and the UE in the area where the serving cell's signal quality is less than the second reference value as the ON, among the neighbor cells reported using the measurement report message.

18. The apparatus of claim 14, wherein the NRT manager inserts the neighbor cell determined as the ON or the HN to an NRT, and sets a type of the neighbor cell to an ON or HN type in the NRT according to the determination result.

19. The apparatus of claim 18, wherein the NRT manager initially sets a Time Tracking Loop (TTL) value for the neighbor cell if the neighbor cell is inserted to the NRT, updates the TTL value of the neighbor cell to a value one less than its own value if the neighbor cell is not reported from the UE by using the measurement report message for a specific period, and removes the neighbor cell from the NRT if the updated TTL value of the neighbor cell is 0.

20. The apparatus of claim 14, wherein the NRT manager determines a resource usage ratio of the neighbor cell and the serving cell if the neighbor cell is determined as the ON, determines a handover failure rate with respect to the neighbor cell, and determines a ranking of the neighbor cell in the NRT in an ascending order of the resource usage ratio by using the determined resource usage ratio of the neighbor cell and the serving cell and the handover failure rate with respect to the neighbor cell.

21. The apparatus of claim 20, wherein the ranking of the neighbor cell is determined by using the following equation:

$$\omega_{f_{ij}}^V = \alpha\left(\frac{R_n}{R_{f_{ij}}}\right) + \beta(1 - Y_{f_{ij}})$$

wherein $\alpha + \beta = 1$, $(0 \leq \alpha, \beta \leq 1)$, $(0 \leq R_{f_{ij}}, R_n \leq 1)$ where $R_n$ denotes a resource usage ratio of a serving cell n, $R_{f_{ij}}$ denotes a resource usage ratio of a cell $f_{ij}$, $Y_{f_{ij}}$ denotes a handover failure rate with respect to the cell $f_{ij}$, and α and β denote weights.

22. The apparatus of claim 14, wherein the NRT manager determines an average measurement signal quality of the neighbor cell and the serving cell if the neighbor cell is determined as the HN, determines a handover failure rate with respect to the neighbor cell, and determines a ranking of the neighbor cell in an NRT in a descending order of the average measurement signal quality by using the determined average measurement signal quality of the neighbor cell and the serving cell and the handover failure rate with respect to the neighbor cell.

23. The apparatus of claim 22, wherein the ranking of the neighbor cell is determined by using the following equation:

$$\omega_{f_{ij}}^H = \alpha\left(\frac{\overline{S}_{f_{ij}}}{\overline{S}_n}\right) + \beta(1 - Y_{f_{ij}}) \text{ wherein } \alpha + \beta = 1, (0 \leq \alpha, \beta \leq 1)$$

where $\overline{S}_n$ denotes a average measurement signal quality of a serving cell n, $\overline{S}_{f_{ij}}$ denotes a average measurement signal quality of a cell $f_{ij}$, $Y_{f_{ij}}$ denotes a handover failure rate with respect to the cell $f_{ij}$, and α and β denote weights.

24. The apparatus of claim 14, further comprising a controller for searching for the neighbor cell determined as the HN in an NRT and instructing the UE to perform a handover to the found neighbor cell at the request of a handover for mobility guarantee of the UE and for searching for the neighbor cell determined as the ON in the NRT and instructing the UE to perform a handover to the found neighbor cell at the request of a handover for load balancing of the UE or cell outage compensation.

25. A User Equipment (UE) apparatus for transmitting a measurement report message in a wireless communication system, the apparatus comprising:

a signal quality measurement unit for measuring a serving cell's signal quality and for measuring a neighbor cell's signal quality if at least one of the serving cell's signal quality is greater than a first reference value and the serving cell's signal quality is less than a second reference value, wherein the second reference value is set to a value less than the first reference value; and a message generator for generating a measurement report message comprising the measured neighbor cell's signal quality.

26. The apparatus of claim 25, further comprising a transmission modem for transmitting the generated measurement report message to a serving Base Station (BS).

* * * * *